V. K. SPICER & V. I. SMART.
TRAIN STAFF SYSTEM.
APPLICATION FILED NOV. 9, 1909.

1,022,605.

Patented Apr. 9, 1912.
6 SHEETS—SHEET 3.

V. K. SPICER & V. I. SMART.
TRAIN STAFF SYSTEM.
APPLICATION FILED NOV. 9, 1909.

1,022,605.

Patented Apr. 9, 1912.

Witnesses:
Raphaël Netter
A. L. Vercill

Inventors
Vibe K. Spicer
Valentine I. Smart
By his Attorney

V. K. SPICER & V. I. SMART.
TRAIN STAFF SYSTEM.
APPLICATION FILED NOV. 9, 1909.

1,022,605.

Patented Apr. 9, 1912.

UNITED STATES PATENT OFFICE.

VIBE K. SPICER AND VALENTINE I. SMART, OF MONTREAL, QUEBEC, CANADA.

TRAIN-STAFF SYSTEM.

1,022,605.  Specification of Letters Patent.  Patented Apr. 9, 1912.

Application filed November 9, 1909. Serial No. 527,101.

*To all whom it may concern:*

Be it known that we, VIBE K. SPICER, a citizen of the United States, and VALENTINE I. SMART, a citizen of the Dominion of Canada, residing at Montreal, Province of Quebec, Canada, have invented certain Improvements in Train-Staff Systems, of which the following is a specification.

Our invention relates to staff systems for the control of railway traffic, and has for an object the use of a staff which can be delivered to and from a moving train without the use of any intermediate "pouch" or other holding device. To accomplish this object we use a staff in the form of a ring in place of the metallic rod commonly in use, although we do not wish to limit ourselves to any particular shape of ring. This ring can be supported in a crane adjacent to the trackway, and can be caught therefrom by a "lance" or other receiving device provided on the moving train. A similar crane carried by the train supports the ring for its delivery to another lance or receiving device adjacent the trackway.

In the present invention, as in others of a similar nature, a staff instrument, herein termed a "magazine," is located at each end of the section to be protected, these magazines being connected by appropriate electric circuits and so arranged that the mechanism in one magazine can only be released to deliver a staff therefrom with the sanction of the operator at, and by the proper manipulation of, the other instrument, so that the removal of a staff without due authority is absolutely prevented, thus effecting perfect control of the section and insuring absolute safety under all conditions to the movement of trains through that section.

We will describe a train staff apparatus and system embodying our invention, and then point out the novel features thereof in claims.

In the accompanying drawings.

Similar reference characters refer to similar parts throughout the several views.

Referring now to the drawings, the reference character 20 designates a body or ring-containing portion of the magazine, within which a plurality of rings 23 are stored. Located at the top of the body 20, and secured thereto by bolts 24 is a cap 21, containing a ring-admitting device hereinafter described. Located at the base of the body 20 is a drawer 22, also hereinafter described, by means of which rings can be withdrawn from the storage-chamber 20.

Referring now to Figs. 3, 5, 6, 7, 8, 9 and 10, we will describe in detail the mechanism of the cap or ring admitting device 21. This cap has a slot opening 25 of such shape and size as to freely admit any ring used in the system. Located immediately within the cap and at each side of the slot 25 are guard-rollers 26, mounted to revolve freely on shafts 27 which are in turn rigidly supported in the cap 21. The contour of these rollers is such that they will admit a ring having a corresponding contour, and no other. Thus in the drawings (see Figs. 3, 6 and 7) the rings 23 as shown have a V-shaped recess cut in their sides around their circumferences, and the rollers have corresponding projections. A ring having any other form of contour could not pass the guard-rollers and hence would be barred from the magazine.

Figures 6, 17:
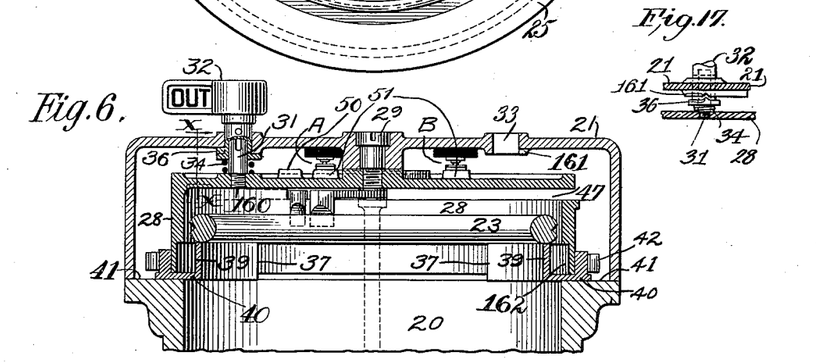
Fig. 6 is a sectional view on the line Z—Z of Fig. 5, looking in the direction of the arrow.
Fig. 17 is a sectional view on the line X—X of Fig. 6 looking in the direction of the arrow.
Figure 7:
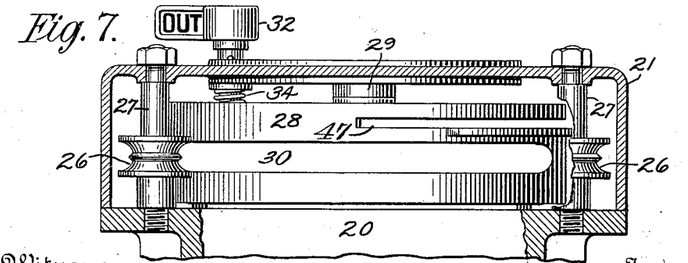
Fig. 7 is a view on the line Y—Y of Fig. 5, looking in the direction of the arrow.
Figure 10:
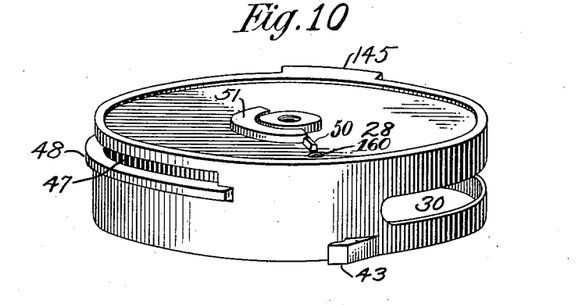
Fig. 10 is a perspective view showing a drum for controlling the admission of a ring to the magazine.

A drum 28, shown in perspective in Fig. 10, is mounted to revolve freely upon a stud 29 secured in the top of the cap 21. This drum has a slot 30 corresponding to the slot 25 in the cap, and for the like purpose of admitting the rings. Rigidly secured to the top of the drum by screwing into a threaded hole 160 is a stud 31 upon which a knob 32 is free to move vertically (see Fig. 6). This knob projects through a circumferential slot 33 in the top of the cap 21, by means of which slot the rotation of the drum is limited to a portion of a complete turn, shown in the drawings to be a half turn. A spring 34 on the stud 31 presses the knob 32 upward, and a V-shaped projection 36 on the knob fits into matching V-shaped slots 161, one of which is cut in the under side of the top of the cap at each end of the travel of the knob (see Figs. 6 and 7) thus holding the knob and the drum somewhat securely at each end of their travel and avoiding the danger of their being moved out of these positions by any cause other than a steady pull on the knob or by depressing the knob. In Fig. 17 the parts are shown with the knob 32 depressed to move the projection 36 out of the slot 161. The ring-slot 30 in the side of the drum is so placed that when the knob 32 is at one end of its slot the ring-slot 30 will register with the corresponding slot 25 in the cap, and a ring can be inserted. When, however, the knob and drum have revolved to the opposite end of their travel, as limited by the slot 33, the slot 30 will be toward the back of the cap, and the insertion of a staff will then be impossible.

Figure 5:
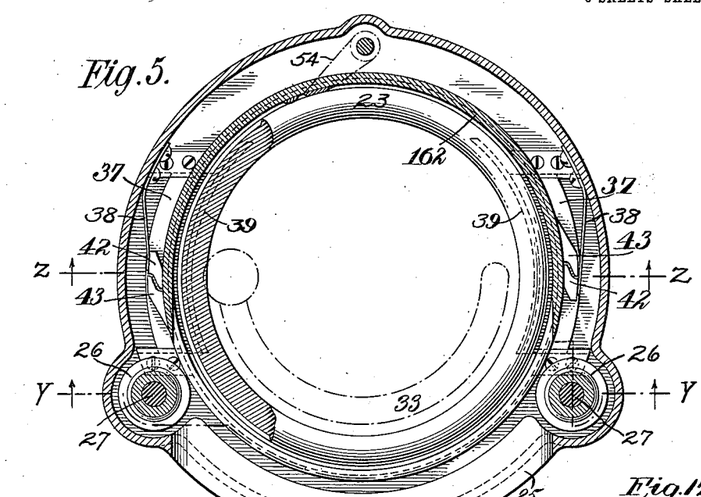
Fig. 5 is a top view in section showing a cap or ring admitting device for the magazine.
Figures 8, 9, 14, 15:
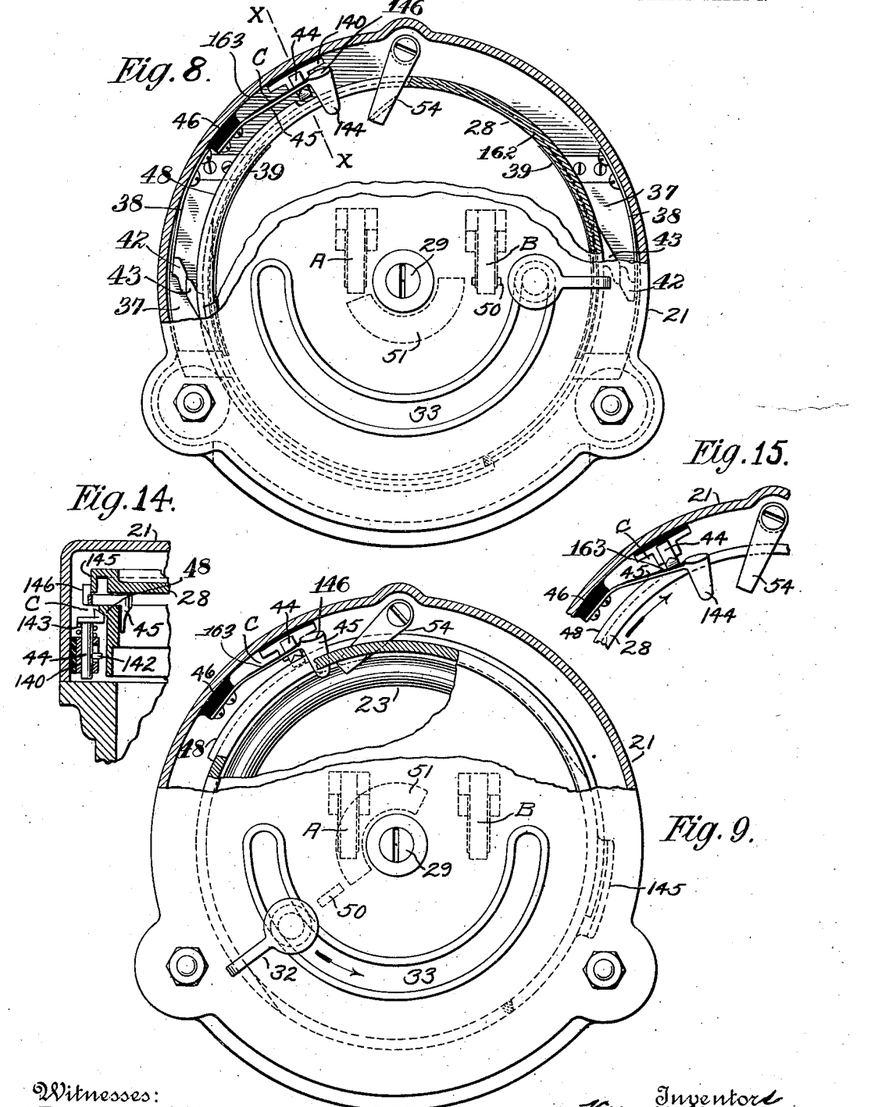
Figs. 8 and 9 are top views, partly in section, showing the arrangements of circuit controllers within the cap.
Fig. 14 is a view on the line X—X of Fig. 8.
Fig. 15 is a plan view showing a different position of the parts of a circuit controller shown in Fig. 8.
Figure 11:
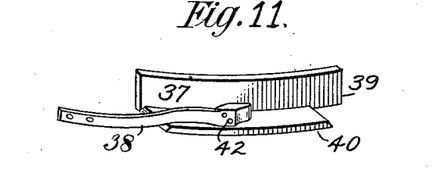
Fig. 11 is a perspective view showing a device for supporting the ring in the cap until it is ready to be dropped into the magazine.

When a ring is inserted within the drum 28, it is desirable that it should be supported to prevent its dropping into the body 20 until the drum has been rotated to close the ring-admitting slots. To accomplish this purpose we provide supporting toes 37, one on each side, which are held by springs 38 secured to the sides of the cap. One of these toes is shown in detail in Fig. 11. Referring to this view and to Figs. 5 and 6, it is seen that the portion 39 of the toe lies inside of the drum in such a position as to support a ring when the toe is in its normal position. A horizontal flat face 40 of the toe slides on a horizontal surface 41 on the inside of the cap, thus effecting a solid support for the toe. Each toe is provided with a lug 42 which is engaged at the proper time by a lug 43 on the drum 28, (see also Figs. 8 and 10) the result being that the toe is pressed outward so that the supporting edge 39 seats itself into a recess 162 cut into the side of the drum 28, and the ring is thereby allowed to drop down into the body 20. The positions of the lugs 42 and 43 which result in the toes being withdrawn into the recess 162 are the positions shown in Fig. 8. The recess 162 above-mentioned is shown in Fig. 8; the supporting edge 39 of the toe 37 is sufficiently narrow to lie within this recess and become flush with the interior circumference of the drum as indicated in Fig. 8. In the arrangement of parts as we have shown them in the drawings, the ring-admitting slot is open when the drum is turned so that the knob 32 is at the left-hand end of its travel, and at this time the toes 37 are in position to support a ring. As the knob 32 is revolved toward the right the ring-admitting slot becomes closed, and at a point near the end of the travel of the drum the supporting toes 37 are moved out from under the ring and the ring drops within the body 20.

Several circuit controllers are operated by the movement of the drum 28, for the purpose of governing the locking and operating circuits between instruments. One of these, designated by C (see Figs. 8, 9, 14 and 15), comprises a spring contact finger 45 supported upon an insulating block 46 secured to the inside of the head 21. The contact finger terminates in a toe 144 which projects inside the drum 28 through a slot 47 in said drum. This slot 47 is shown in Fig. 10. Secured also to the inside of the head 21 and directly below the contact finger 45 is a block 140 also insulated from the head, in which slides vertically a latch contact piece 44. A pin 142 secured to this latch moves in a slot provided in the block 140, thus limiting the movement of the latch 44. This latch 44 is normally held in the upper position of its travel by a spiral spring 143, and when in this upward position it is capable of engaging the spring contact finger 45 and making electrical contact therewith, provided this finger 45 has been previously pushed outward by a ring pressing against its toe 144. There is, however, provided on the circumference of the drum 28 a lug 48 which engages the beveled top face of the latch 44, forcing the latter down against the action of the spring 143, out of its position for engaging the finger 45. There is also provided on the drum 28 an overhanging projection 145, underneath which a lug 146 on the finger 45 can pass when the finger has not been forced outward. When, however, the presence of a ring in the drum has forced the finger 45 to its outward position, the lug 146 rides upon the outer edge of the projection 145, and the finger is in position to be engaged by the latch contact 45 when the latter is released.

The various parts of the contact mechanism just described are located in such positions that their operation will be as follows: When the drum 28 is in the position for receiving a ring, that is when its ring slot is open, the latch 44 is depressed by the lug 48 on the drum. Upon the insertion of a ring within the drum, the spring finger 45 is forced outward as the drum is revolved and the ring admitting slot becomes closed, the lug 146 rides upon the overhanging projection 145, thereby relieving the ring of the pressure due to the contact spring 45 and allowing said ring to drop when its supporting toes are removed. While the contact finger 45 is still held outward by means of the overhanging projection 145, the latch 44 is released by the lug 48, and moves upward in position to engage the finger 45 when the latter has been released from the projection 145. This last movement takes place immediately before the drum has reached its limiting position, hence the contact of the circuit controller C will only be closed when the drum is in this limiting position. The object in providing this mechanism for circuit controller C is to prevent its contact being closed at any time other than when a ring has been fully inserted. Thus, if the drum 28 were revolved to open the ring-admitting slot, and when then returned to its closed position without the insertion of a ring, the lug 146 would pass underneath the overhanging projection 145 and the contact finger 45 would not be in position for engagement by the latch 44 when the latter is released. This condition is shown in Fig. 15, wherein the latch 44 has been released, rising up behind the contact finger 45 which is in its normal position, no ring having been inserted.

In order to avoid an electrical connection between the spring contact finger 45 and the latch 44 if the two should come into engagement while they are in the positions shown in Fig. 15, the surface of the back of the contact finger 45 may be covered with insulating material 163.

It will be seen that this device prevents "plugging," or the false closing of the contact C when no ring has been inserted.

It is to be understood that the overhanging projection 145 does not reach the lug 146 until the ring-admitting slot has become fully closed; that is, until the drum 28 has rotated to such a point that the slot 30 has passed entirely out of register with the opening 25 in the cap 21; hence the toe 144 could not be held out by any exterior means and be made thereby to ride upon the overhanging projection 145.

Figure 12:
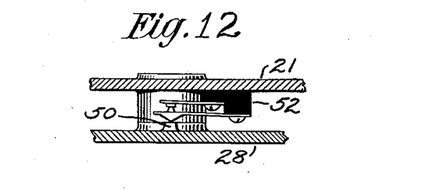
Fig. 12 is a view showing a form of circuit controller operated by the drum shown in Fig. 10.
Figure 13:
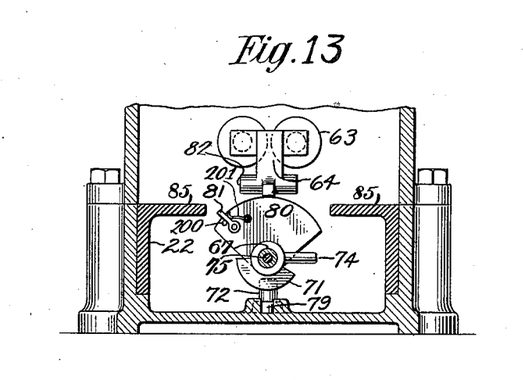
Fig. 13 is a view on the line X—X of Fig. 3, looking in the direction of the arrow and showing in detail a portion of the mechanism controlling the operation of the drawer shown in Fig. 4.

Another set of circuit controllers are located at the top of the cap and are arranged to be operated by lugs 50 and 51 placed on the top surface of the drum 28 (see Figs. 6, 8, 9, 10 and 12). These circuit controllers comprise pairs of contact fingers designated as A and B, secured to the under surface of the top of the cap 21 and so adjusted as to be normally out of contact, or separated from each other at all times except when the under finger of each pair is pressed upward against its corresponding upper finger by coming into contact with the lugs 50 or 51 on the rotating drum. A detail view of one of these pairs of controllers is shown in Fig. 12. These contacts A and B are suitably insulated from each other and from the cap by means of insulation blocks 52. The functions of these circuit controllers are described hereinafter in connection with the operation of the instruments.

Figures 1, 19:
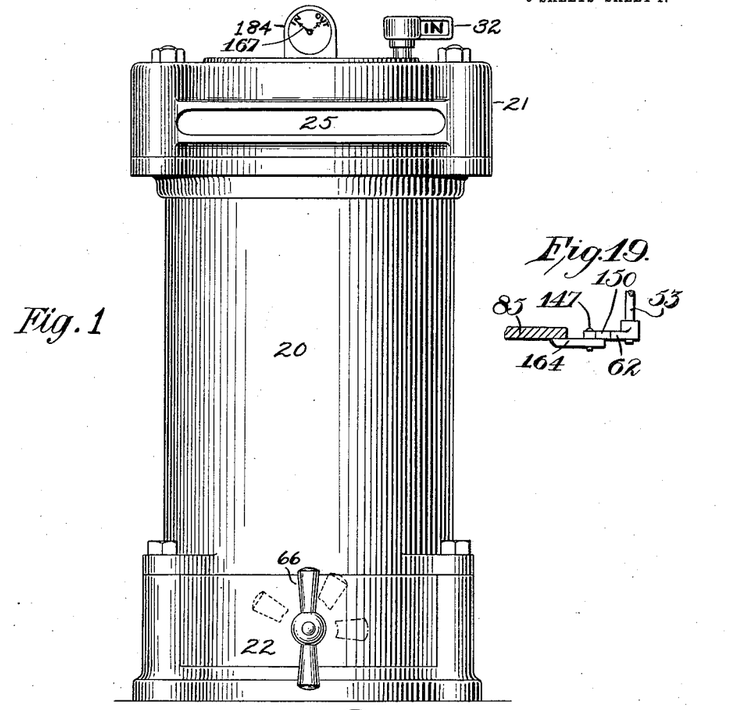
Figure 1 is a front elevation of a magazine embodying our invention.
Fig. 19 is a sectional view on the line X—X of Fig. 4 looking in the direction of the arrow.
Figure 2:
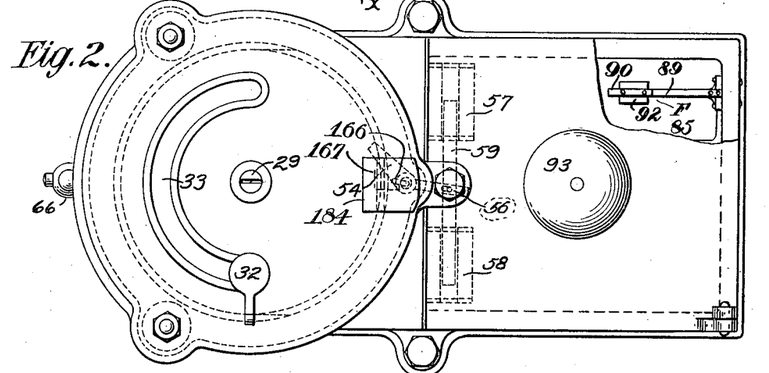
Fig. 2 is a top view of the same.
Figure 3:
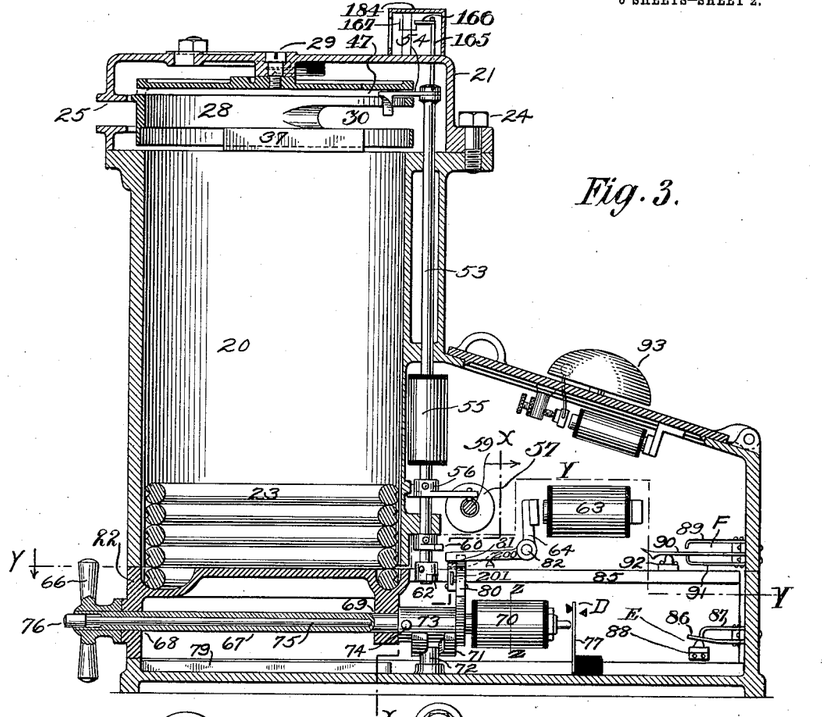
Fig. 3 is a side view of the magazine shown in Figs. 1 and 2, partly in section.
Figure 4:
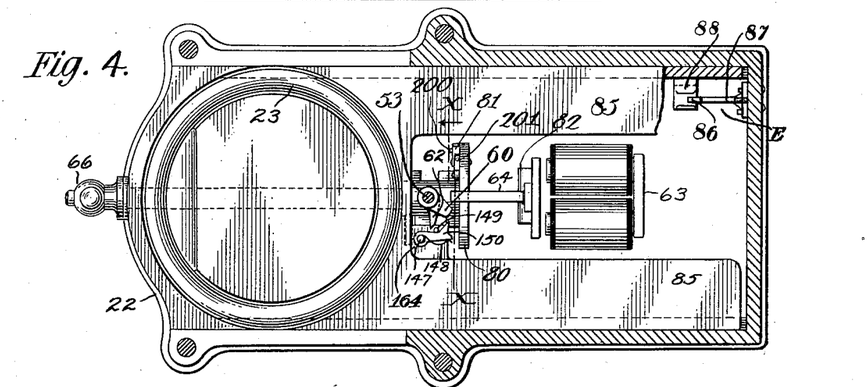
Fig. 4 is a section on the line Y—Y of Fig. 3, looking in the direction of the arrow, and showing a ring drawer, a device for withdrawing a ring from the magazine of the preceding figures.

Referring now to Fig. 3, a vertical shaft 53 passes up through the rear of the magazine, having at its upper end a lug or crank 54 which projects into the interior of the drum 28 through the slot 47 in this drum and is arranged to be engaged by a ring. This crank normally projects well into the drum as shown in Fig. 8, but upon the insertion of a ring the crank is forced to the left as shown in Fig. 9, being thus rotated through an angle and carrying with it the shaft 53. The crank 54 is so shaped as to lie flush with the interior of the drum 28 when rotated inward by the presence of a ring. Secured to the shaft 53 is a commutator 55 which carries electrical contacts as hereinafter described. Also secured to the shaft 53 is a crank 56 which projects rearward and is pinned to a horizontal core 59 which operates laterally through two solenoids 57 and 58. (See Figs. 2 and 3). Thus the energization of one of these solenoids or the other will move the core 59, and hence the shaft 53, in respectively one direction or the other.

An indicator 184 is mechanically actuated by the shaft 53, showing, from the position of the shaft, whether or not a ring has been removed from the instrument at either end of the block. This indicator comprises a pointer 167 mounted upon a shaft which is suitably supported within the casing of the indicator, this shaft being bent upward at its rear end thus forming an arm which passes through a hole in a crank 166. The crank 166 is secured to an upwardly extending portion 165 of the shaft 53. The arrangement of these parts is such that when the shaft 53 is in the position shown in Figs. 2, 5 and 9, the toe 54 being flush with the interior surface of the drum 28, the pointer 167 is rocked toward the word "In" on the indicator dial. When, however, the shaft 53 is rotated by the withdrawal of a ring from the magazine, as hereinafter explained, the pointer 167 is rocked toward the word "Out" on the dial.

Figure 18:
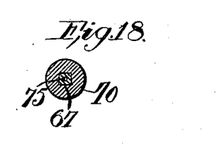
Fig. 18 is a sectional view on the line Z—Z of Fig. 3.

Leaving for the present the remaining apparatus on the lower end of shaft 53 we will describe in detail the ring-withdrawing drawer 22 and the mechanism controlling its operation. Referring to Figs. 1, 3, 4 and 13, it is seen that this drawer slides in guides provided in the base of the body 20. An annular groove in the top of the drawer is cut in such form as to admit one ring only. The lower ring of the supply in the body 20 will lie in this groove and will hence be drawn out with the drawer. To prevent the remaining rings from falling when the drawer is withdrawn, the drawer is extended to the rear by the flat surface 85, upon which the lower ring will rest while the drawer is out, this ring immediately falling into its position in the groove when the drawer is again closed. A knob 66 is secured to a shaft 67 trunnioned in the drawer at points 68 and 69. Mounted upon the base of the magazine near the rear of the drawer is a commutator 70 having a square hole into which fits loosely the end of the shaft 67, which is also squared. A sectional view of the commutator and shaft is shown in Fig. 18. It will be seen that by this arrangement the drawer can be withdrawn by means of the knob 66, the shaft 67 at the same time slipping out of the hole through the commutator 70. A suitable collar 73 on the shaft 67 at one of its points of support in the drawer avoids its being pulled out of the drawer. The shaft 67 is hollow throughout its entire length and contains a rod 75 which is free to move longitudinally within the shaft. This rod 75 acts as a push-button for operating the circuit controller D, manipulation being effected by means of the end 76 of the rod projecting through the knob 66. Thus it will be seen that when the drawer is fully closed the contact spring 77 of the circuit controller D may be pushed backward by means of push-button 76.

Secured to the collar 73 is a curved cam 71 within the slot of which slides a pin 72 secured to the base of the magazine. Thus when the knob 66 is turned slightly to the right this cam will be forced slightly forward by the pin 72 and the drawer will be partially opened. Also secured to the collar 73 is a pin 74 which, while the knob 66 is vertical or normal, projects to the right. When, however, the knob is turned a quarter rotation to the right, as is necessary before fully withdrawing the drawer, this pin projects downward into a slot or groove 79 cut in the base of the magazine. This groove 79 ends at a point near the front of the base. The functions of the pin and groove are to prevent the knob 66 from being rotated while the drawer is withdrawn, and also to prevent the drawer from being totally withdrawn from the base of the magazine. This limiting position is determined by the engagement of the pin 74 with the front end of the groove. Also secured to the collar 73 is a segment 80 which carries a pivoted locking dog 81. An electromagnet 63 is provided with an armature mounted upon one arm of a bell-crank 64 which bell-crank is pivoted at 82. The other arm of the bell crank, when the magnet is deenergized, rests upon the curved surface of the segment 80 and engages the dog 81, thereby preventing the segment from being rotated more than a small portion of a revolution to the right. When, however, the magnet 63 is energized, the horizontal bell-crank arm is raised out of the path of the dog 81, and the segment may then be rotated farther to the right. The dog 81 is pivotally mounted on the segment 80 and is normally pressed against a pin 200 by means of a spring 201. Hence the dog 81 prevents the segment 80 being rotated toward the right when the bell-crank is down, but the dog is capable of being rotated downward out of the path of the bell-crank during rotation of the segment 80 to the left. It will be seen therefore that after the segment has been rotated to the right past the dog 81, it may be returned to its normal position even though the bell-crank may be rigidly held in its downward position by exterior means which we will now describe.

To prevent the improper releasing of the locking segment 80, a latch toe 60 is secured to the vertical shaft 53 in such position that when the shaft is turned to one limiting position of its rotation the latch toe 60 lies directly above the horizontal latch-arm of the bell-crank 64 and thus prevents the arm being raised even though the magnet 63 might be energized. When, however, the shaft is rotated to its other position the latch-toe 60 is moved out of the path of the bell-crank arm, and the segment 80 can be released.

Means are provided at the lower end of the vertical shaft 53 for rotating this shaft while the drawer 22 is being closed. A crank 62 is secured to the shaft in such position as to be engaged by a movable dog 150. This dog is pivoted at 147 to a portion 164 of the drawer 22 (see Figs. 4 and 19), and is normally held against a pin 149 by means of a spring 148. The arrangement is such that while the drawer is being pulled out for the removal of a ring the dog 150 rotates on its pivot and passes around the crank 62. The shaft 53 is prevented from being rotated by the dog 150 during this opening movement of the drawer by the fact that the toe 54 secured to the upper extremity of the shaft 53 is resting in its normal position against the inside surface of the drum 28 as indicated in Figs. 5 and 9. When, however, the drawer is being closed, the dog 150 engages the crank 62, thus rotating the shaft 53, and changing the position of the commutator 55 for purposes hereinafter described. This movement also rotates the toe 54, on the top of the shaft 53, out into the drum 28 in position to be engaged by a ring placed within said drum.

Two sets of circuit controllers are operated by the movements of the drawer 22, designated respectively by E and F. The circuit controller E (see Figs. 3 and 4) comprises a stationary contact finger 87 and a flexible contact finger 86, normally separated from each other, but arranged to be pressed into mutual contact when the ring drawer 22 is closed, by means of a lug 88 secured to the drawer. This lug is so placed that while the drawer is fully closed the fingers will be pressed into contact, but when the drawer is partially opened by the action of the cam 71 as previously described, the contact between fingers 86 and 87 will be broken. The circuit controller F (see Figs. 2 and 3) comprises two stationary contact fingers 89 and 91, and a flexible contact finger 90, all mounted upon the base of the magazine. The flexible finger 90 normally makes contact with the lower finger 91, but when raised by means of a lug 92 secured to the drawer 22, it breaks contact with finger 91 and makes contact with the upper finger 89. This lug 92 is so located as to change the contacts when the drawer is near its closed position. The contact fingers and the lug 92 are furthermore so located that the lug 92 will not reach the body 20 when the drawer is drawn out to the limit of its travel.

Having described the mechanical construction of one form of apparatus embodying our invention, we will explain an arrangement of electrical circuits connecting two magazines and trace in detail a complete cycle of operations of the system.

Figure 16:
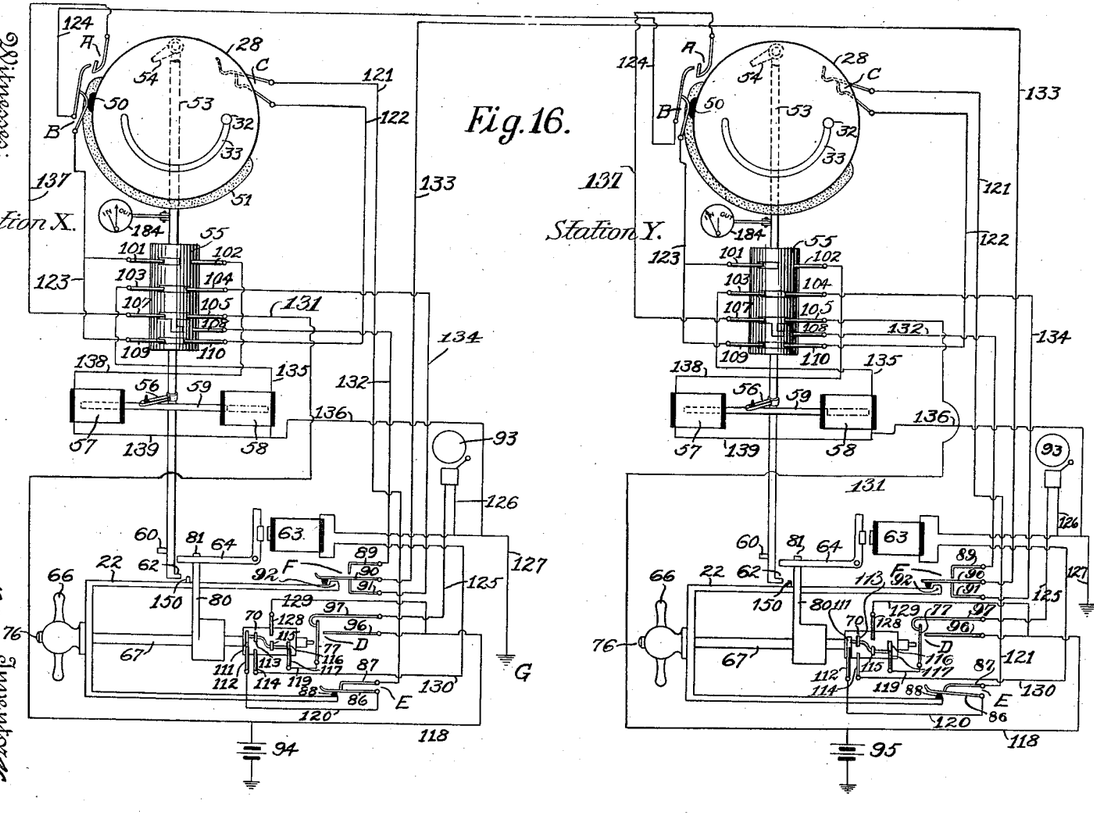
Fig. 16 is a diagrammatic view showing the arrangement of parts for two instruments, and the electric circuits connecting them.

Referring now to Fig. 16, it will be noted that the parts of the mechanism are diagrammatic but that they bear the same designating characters as in the other views. In this diagram all parts are shown in their normal positions; that is, no staffs are out of either instrument, the ring-admitting slot in each instrument is closed, the ring-drawer in each instrument is closed and locked, and either instrument is in condition for having a staff withdrawn. The internal condition of each instrument is as follows: The latch-toe 60 is out of engagement with the latch-arm 64, thus allowing latch arm 64 to be withdrawn from engagement with lock segment 80 when the magnet 63 is energized. On commutator 55, circuits through points 101—102, 105—108, are opened, and circuits through points 103—104; 105—107, and 109—110 are closed. Drawer knob 66 is vertical and on commutator 70, circuits through points 113—114, 128—115, are opened, and circuits through points 111—112, and 116—117 are closed.

To remove a staff from the magazine at station X the following operations are necessary: Station X calls for release by pushing button 75, thus closing points 77 and 96 of circuit controller D. Current then flows from battery 94, through wire 118, contacts 96 and 77, wire 119, points 117 and 116, points 111 and 112, wire 120, contacts 86 and 87 of circuit controller E, wire 121, circuit controller C, wire 122, points 110 and 109 on commutator 55, wire 123, circuit controller B, wire 124, circuit controller B on magazine Y, wire 123, points 109 and 110 on commutator 55, wire 122, circuit controller C, wire 121, circuit controller E, wire 120, points 112 and 111, points 116 and 117, wire 119, contact springs 77 and 97, wire 125, bell 93, wire 126, wire 127 to ground G, and thence return to battery 94 at station X. This circuit rings the bell 93 at station Y, and calls the attention of the operator at Y to the fact that X desires to remove a staff. In order to release the drawer of magazine X, the operator at station Y turns his knob 66 to the left, as indicated in dotted lines in Fig. 1, thereby closing points 128—115 on commutator 70. At the same time the operator at X, expecting a release, turns his knob 66 to the right until stopped by the dog 81 on segment 80 engaging the latch-arm of bell-crank 64. This closes points 113—114 on commutator 70. Current then flows from battery 95 through wire 118, 129, points 128—115, points 111—112, wire 120, circuit controller E, wire 121, circuit controller C, wire 122, points 110—109, wire 123, circuit controller B wire 124, to station X, circuit controller B, wire 123, points 109—110 of commutator 55, wire 122, circuit controller C, wire 121, circuit controller E, wire 120, points 112—111, points 113—114, wire 130, magnet 63, wire 127 to ground G and thence back to battery 95 at station Y. The magnet 63 being energized by this current, the latch arm 64 is raised out of engagement with the dog on segment 80, and the knob 66 can then be turned its full quarter-rotation to the right. This unlocks the drawer and forces it outward slightly, owing to the action of the cam 71 as has been heretofore described, and the contact of circuit breaker E is broken, thereby opening the above circuit and deënergizing magnet 63. The ring drawer can now be pulled out and the ring removed. While the drawer is again being closed and locked, the dog 150 on the drawer engages the crank 62 on the shaft 53, turning the shaft so that the latch toe 60 engages the latch-arm 64, preventing the latter from being again raised out of its engaging position with the dog 81. By this movement of the shaft 53, contact points 101—102, 105—108 on commutator 55 are closed, and points 103—104, 105—107, and 109—110 are opened. Toward the last part of the motion of closing the drawer, the flexible spring 90 of circuit controller F is moved out of contact with the spring 91, and into contact with the spring 89. As knob 66 is turned back to its normal (vertical) position the drawer is fully closed by the action of the cam 71, the spring 90 is restored to its position of contact with the lower spring 91, and contact is again closed at the circuit controller E. At the instant when spring 90 was closed into contact with spring 89 in circuit controller F, a circuit was closed as follows: from battery 94 at station X, through wire 131 to points 105—108 on commutator 55, wire 132, circuit controller F, wire 133, to instrument Y, springs 90 and 91 of circuit controller F, wire 134, points 104—103, wire 135, solenoid 58, wire 136, thence to ground G and return to battery 94. The solenoid 58 of instrument Y being thereby energized, its core 59 is drawn in, rotating the shaft 53 so that the latch-toe 60 engages the latch arm 64 of the bell-crank, preventing the segment 80 from being released if magnet 63 should be energized. It will be seen that the drawers of both instruments are now mechanically locked, and no further rings can be removed from either. This fact is made known to the operators at each station by the indicators 184, whose fingers now point to "Out," having been shifted to this position by the rotation of the shafts 53.

To place the ring in instrument Y, the operations are as follows: Rotate the drum 28 by turning the knob 32 to the left to its limiting position. This movement opens the contacts of circuit controller B by moving the lug 50 out of its position under the flexible spring, (see Figs. 8 and 12) and it opens circuit controller C by depressing the latch 44 as previously described. It also opens the ring-admitting slot, into which the ring can now be inserted. When the ring is placed fully within the drum, it engages the lug 54, as hereinbefore described, rotating the shaft 53, thereby disengaging the latch toe 60 from engagement with the latch-arm 64, and moving the commutator back to its normal position as shown in Fig. 16. Upon starting the rotation of the drum to close the ring-admitting slot, circuit-controller A is closed by means of the lug 51, and remains closed until the drum has nearly completed its rotation, when it is opened, and circuit controller B is again closed. During the time that circuit controller A is closed, a circuit is completed as follows: from battery 95 through wire 131, points 105—107 on commutator 55, wire 137, circuit controller A, wire 124 to instrument X, circuit controller B, wire 123, points 101—102 on commutator 55, wire 138, solenoid 57, wire 139 to ground G, and thence return to battery 95. The solenoid 57 being energized by this current draws in the core 59, thereby replacing the shaft 53 of instrument X in its normal position with the latch-toe 60 out of engagement with the latch 64. Both instruments are now in normal condition throughout, and either one is capable of being unlocked for the removal of a staff, this condition being shown by the indicators 184, whose pointers have been returned to the word "In" by the rotation of the shafts 53.

Having thus described our invention, what we claim is:

1. In combination with train staffs in the form of rings, a staff instrument therefor comprising a suitable casing having a body adapted to retain a plurality of said staffs, a slot adjacent the top of said casing for the admission of said staffs to the body of the casing, a rotatable drum adapted to receive one of said staffs and having a slot adapted to register with the slot in the casing, a drawer located adjacent the bottom of said casing for the removal of staffs from the body of the casing, and means controlled by the position of the rotatable drum for locking the said drawer in its closed position.

2. In combination with train staffs in the form of rings, a staff instrument therefor comprising a suitable casing having a body adapted to retain a plurality of said staffs, a slot adjacent the top of said casing for the admission of said staffs, a rotatable drum adapted to receive one of said staffs and having a slot adapted to register with the slot in the casing, toes projecting inwardly in the top of said casing to retain the staff in the said drum, and lugs on said drum adapted to move the toes out of the path of the staff when the drum is rotated to close the slot in the casing.

3. In combination with train staffs in the form of rings, a staff instrument therefor comprising a suitable casing having a body adapted to retain a plurality of said staffs, a slot adjacent the top of said casing for the admission of said staffs, a rotatable drum adapted to receive one of said staffs and having a slot adapted to register with the slot in the casing, toes projecting inwardly in the top of said casing to retain the staff in the said drum, and means operated by the drum for moving the toes out of the path of the staff when the drum is rotated to close the slot in the casing.

4. In combination with train staffs in the form of rings, a staff instrument therefor comprising a suitable casing having a body adapted to retain a plurality of said staffs, a slot adjacent the top of said casing for the admission of said staffs, a rotatable drum adapted to receive one of said staffs and having a slot adapted to register with the slot in the casing, toes located in the top of the casing and biased to project inwardly to retain a staff in the drum, and means operated by the drum for moving the toes out of the path of a staff and for permitting them to move into the path of a staff according to whether the drum is in position to close or open the staff-admitting slot.

5. In combination with train staffs in the form of rings, a staff instrument therefor comprising a suitable casing having a body adapted to retain a plurality of said staffs, a slot adjacent the top of said casing for the admission of said staffs to the body of the casing, a rotatable drum adapted to receive one of said staffs and having a slot adapted to register with the slot in the casing, a drawer located adjacent the bottom of said casing for the removal of staffs from the body of the casing, an electro-magnetic locking device for locking the drawer in its closed position, and a circuit controller operated by the rotatable drum for the control of said locking device.

6. In combination with train staffs in the form of rings, two staff instruments therefor, each comprising a suitable casing having a body adapted to retain a plurality of said staffs, a slot adjacent the top of the casing of each instrument for the admission of staffs to the body of said casings, a rotatable drum in each instrument adapted to receive one of said staffs and having a slot adapted to register with the slot in the casing, a drawer located adjacent the bottom of each casing for the removal of staffs from the body of said casing, an electro-magnetic locking device for each drawer for holding said drawers in their closed positions, circuit controllers operated respectively by the rotatable drum of each instrument for controlling said locking devices whereby the said drawers are unlocked only when the staff-admitting slot of each instrument is closed by its respective drum.

7. In combination with train staffs in the form of rings, a staff instrument therefor comprising a suitable casing having a body adapted to retain a plurality of said staffs, a slot adjacent the top of said casing for the admission of said staffs to the body, a drawer located adjacent the bottom of said casing for the removal of staffs from the body, a locking device adapted to lock said drawer in the closed position, a holding device adapted to engage the said locking device for holding the locking device in its locking position, means operated by the closing of the drawer for moving said holding device into engaging position, and means operated by a staff upon the insertion thereof in the staff-admitting slot for moving the holding device out of engaging position.

8. In combination with train staffs in the form of rings, a staff instrument therefor comprising a suitable casing having a body adapted to retain a plurality of said staffs, a slot adjacent the top of said casing for the admission of said staffs to the body, a drawer located adjacent the bottom of said casing for the removal of staffs from the body, a locking device adapted to lock said drawer in the closed position, a holding device adapted to engage the said locking device to hold the locking device in its locking position, means operated by the closing of the drawer for moving said holding device into engaging position, means operated by a staff upon the insertion thereof in the staff-admitting slot for moving the holding device out of engaging position, and electro-magnetic means for also moving the said holding device into and out of engaging position.

9. In combination with train staffs in the form of rings, a staff instrument therefor comprising a suitable casing having a body adapted to retain a plurality of said staffs, a slot adjacent the top of said casing for the admission of said staffs to the body, a drawer located adjacent the bottom of said casing for the removal of staffs from the body, an electro-magnetically controlled locking device for locking the drawer in its closed position, a holding device adapted to engage the locking device for holding the said locking device in the locking position, means operated by the closing of the drawer for moving the holding device into engaging position, and means operated by a staff upon the insertion thereof in the staff-admitting slot for moving the holding device out of engaging position.

10. In combination with train staffs in the form of rings, a staff instrument therefor comprising a suitable casing having a body adapted to retain a plurality of said staffs, a slot adjacent the top of said casing for the admission of said staffs to the body, a drawer located adjacent the bottom of said casing for the removal of staffs from the body, an electro-magnetically controlled locking device for locking the drawer in its closed position, a holding device adapted to engage the locking device for holding the said locking device in the locking position, means operated by the closing of the drawer for moving the holding device into engaging position, means operated by a staff upon the insertion thereof in the staff-admitting slot for moving the holding device out of engaging position, and electro-magnetic means for also moving the said holding device into and out of engaging position.

11. In combination with train staffs in the form of rings, a staff instrument therefor comprising a suitable casing having a body adapted to retain a plurality of said staffs, a slot adjacent the top of said casing for the admission of said staffs to the body, a drawer located adjacent the bottom of said casing for the removal of staffs from the body, an electro-magnetically controlled locking device for locking the drawer in its closed position, a holding device adapted to engage the locking device for holding the said locking device in the locking position, and electro-magnetic means for moving said holding device into and out of engaging position.

12. In combination with train staffs in the form of rings, a staff instrument therefor comprising a suitable casing having a body adapted to retain a plurality of said staffs, a slot adjacent the top of said casing for the admission of said staffs to the body, a drawer located adjacent the bottom of said casing for the removal of staffs from the body, an electro-magnetically controlled locking device for locking the drawer in its closed position, a holding device adapted to engage the said locking device to hold the locking device in its locking position, a dog carried by the drawer and adapted to rotate the holding device into engaging position during the closing of the drawer, and a toe operated by a staff upon the insertion thereof in the staff-admitting slot for rotating said holding device out of engaging position.

13. In combination with train staffs in the form of rings, a staff instrument therefor comprising a suitable casing having a body adapted to retain a plurality of said staffs, a slot adjacent the top of said casing for the admission of said staffs to the body, a drawer located adjacent the bottom of said casing for the removal of staffs from the body, a rotatable member mounted in said drawer, two coacting lugs, one of which is carried by the rotatable member and the other of which is mounted on the casing, which lugs are adapted to hold the drawer closed or permit it to be opened according to whether or not the rotatable member is in position for engagement of the two lugs, a handle for rotating the rotatable member, and means for locking said rotatable member in position for engagement of the two lugs.

14. In combination with train staffs in the form of rings, a staff instrument therefor comprising a suitable casing having a body adapted to retain a plurality of said staffs, a slot adjacent the top of said casing for the admission of said staffs to the body, a drawer located adjacent the bottom of said casing for the removal of staffs from the body, a rotatable member mounted in said drawer, two coacting lugs, one of which is carried by the rotatable member and the other of which is mounted on the casing, which lugs are adapted to hold the drawer closed or permit it to be opened according to whether or not the rotatable member is in position for engagement of the two lugs, a handle for rotating the rotatable member, and an electro-magnetically controlled locking device for locking said rotatable member in position for the engagement of the two lugs.

15. In combination with train staffs in the form of rings, a staff instrument therefor comprising a suitable casing having a body adapted to retain a plurality of said staffs, a slot adjacent the top of said casing for the admission of said staffs to the body, a drawer located adjacent the bottom of said casing for the removal of staffs from the body, a rotatable member mounted in said drawer, two coacting lugs, one of which is carried by the rotatable member and the other of which is mounted on the casing, which lugs are adapted to hold the drawer closed or permit it to be opened according to whether or not the rotatable member is in position for engagement of the two lugs, a handle for rotating the rotatable member, an electro-magnetically controlled locking device for locking the rotatable member in position for engagement of the two lugs, and a holding device for holding said locking device in the locking position.

In testimony whereof, we have signed our names to this specification in the presence of two subscribed witnesses.

VIBE K. SPICER.
    VALENTINE I. SMART.

Witnesses:
  NORA HENCHEY,
  JEAN BAUDOUIN.

---

Copies of this patent may be obtained for five cents each, by addressing the "Commissioner of Patents, Washington, D. C."